(12) United States Patent
Powell et al.

(10) Patent No.: US 9,361,483 B2
(45) Date of Patent: Jun. 7, 2016

(54) ANTI-WIKILEAKS USB/CD DEVICE

(75) Inventors: Carl Marshall Eliot Powell, Laytonsville, MD (US); Thao N. Hull, Ellicott City, MD (US)

(73) Assignee: FORCEPOINT FEDERAL LLC, Heredon, VA (US)

( * ) Notice: Subject to any disclaimer, the term of this patent is extended or adjusted under 35 U.S.C. 154(b) by 0 days.

(21) Appl. No.: 13/545,816

(22) Filed: Jul. 10, 2012

(65) Prior Publication Data

US 2014/0019775 A1  Jan. 16, 2014

(51) Int. Cl.
*G06F 21/78* (2013.01)
*G06F 21/10* (2013.01)
*H04L 9/08* (2006.01)

(52) U.S. Cl.
CPC .............. *G06F 21/78* (2013.01); *G06F 21/10* (2013.01); *H04L 9/08* (2013.01)

(58) Field of Classification Search
CPC ....... G06F 21/10; G06F 21/606; G06F 21/60; G06F 21/78; H04L 9/3234; H04L 9/083; H04L 9/0877; H04L 9/08; H04L 9/18
USPC ......... 713/189, 193, 152, 165, 166, 176, 182; 709/248; 380/42, 44, 201, 277
See application file for complete search history.

(56) References Cited

U.S. PATENT DOCUMENTS

| | | | | |
|---|---|---|---|---|
| 2001/0037450 A1* | 11/2001 | Metlitski | ............. | G06F 12/1408 713/152 |
| 2002/0176575 A1* | 11/2002 | Qawami | ................. | G06F 21/10 380/201 |
| 2005/0114689 A1* | 5/2005 | Strom | ...................... | G06F 21/10 713/193 |
| 2005/0147250 A1* | 7/2005 | Tang | ............................. | 380/259 |
| 2005/0177740 A1* | 8/2005 | Athaide | ................... | G06F 21/10 713/189 |
| 2006/0005257 A1 | 1/2006 | Tohru et al. | | |
| 2006/0282669 A1* | 12/2006 | Legg | ........................ | G06F 21/62 713/171 |
| 2007/0300078 A1* | 12/2007 | Ochi | ....................... | G06F 21/10 713/189 |
| 2010/0023757 A1 | 1/2010 | Nguyen-Huu et al. | | |
| 2010/0054462 A1* | 3/2010 | Asano | ............. | G11B 20/00086 380/42 |
| 2012/0102102 A1* | 4/2012 | Ueda | ................. | G06F 17/30017 709/203 |
| 2012/0102335 A1* | 4/2012 | Goodman | ............. | H04L 9/0822 713/189 |
| 2012/0137135 A1* | 5/2012 | Kasahara et al. | ....... | G06F 21/78 713/176 |
| 2012/0303974 A1* | 11/2012 | Lin | ........................ | G06F 21/10 713/193 |
| 2014/0019753 A1* | 1/2014 | Lowry | .................... | G06F 21/62 713/155 |

FOREIGN PATENT DOCUMENTS

| | | |
|---|---|---|
| EP | 1 130 494 A2 | 9/2001 |
| EP | 1 511 030 A1 | 3/2005 |
| WO | WO 2008/028768 A1 | 3/2008 |

OTHER PUBLICATIONS

Alf Zugenmaier et al., Transparent Encryption for External Storage Media with Key Management Adapted to Mobile Use, Dec. 7-11, 2009, IEEE, pp. 333-339.*

(Continued)

*Primary Examiner* — Bradley Holder
*Assistant Examiner* — Fahimeh Mohammadi
(74) *Attorney, Agent, or Firm* — Lewis Roca Rothgerber Christie LLP (57) ABSTRACT

A method for encrypting and storing data on a removable medium includes: obtaining a medium key uniquely associated with the removable medium; encrypting the data using the medium key to generate encrypted data; and writing the encrypted data onto the removable medium.

11 Claims, 8 Drawing Sheets

(56) References Cited

OTHER PUBLICATIONS

Jeong-Hyun Kim et al., Protection Scheme for Secure MPEG-2 Streaming, 2004, IEEE, vol. 2, pp. 927-930.*

S.A.F.A. van den Heuvel et al., Secure Content Management in Authorised Domains, 2002, pp. 1-8.*

Written Opinion of the International Searching Authority for International Application No. PCT/US2013/039996, filed May 7, 2013, Written Opinion of the International Searching Authority mailed Oct. 8, 2013 (4 pgs.).

International Search Report for International Application No. PCT/US2013/039996, filed May 7, 2013, International Search Report dated Sep. 27, 2013 and mailed Oct. 8, 2013 (3 pgs.).

* cited by examiner

ANTI-WIKILEAKS USB/CD DEVICE

BACKGROUND

1. Field

Embodiments of the present invention are related to the field of data encryption and encryption key management.

2. Description of Related Art

Cryptography is frequently used to control unauthorized viewing of sensitive data on a variety of removable media types (e.g., USB flash drives, CD-ROMs, DVD-ROMs) by encrypting the data. However, the encryption (or decryption) key associated with that data is generally possessed by the user. While this allows the user to access their own data and prevents others from using that data without the owner's knowledge, it would not prevent an insider leak as happened in the highly publicized WikiLeaks release. (In that case, the owner of the media was also the source of the release.) Encrypting the information using standard methods would not have blocked the release of the information because the authorized owner (or possessor) of the medium containing the sensitive data would likely also possess the decryption key and therefore would be able to decrypt the contents once outside of the enterprise (e.g., a corporation, a facility, a military unit, etc.).

Prohibiting the use of removable media within an enterprise is one alternative, but this deprives the enterprise of the advantages of being able to quickly move large amounts of information (e.g., physically transporting removable media from one place to another when network connections are comparatively slow). For example, such restrictions have generated a enough of an impact that some military units in the field override these restrictions because the loss of function was deemed to have a greater negative impact than a potential leak might.

Therefore, it would be desirable to have a system that is capable of restricting the disclosure of information by an insider who has authorization to view or use that information. Existing techniques either provide very limited protection against this kind of attack or provide protection in a manner that unacceptably reduces the functionality of the system being protected.

SUMMARY

Embodiments of the present invention are directed to systems and methods for storing, encrypting, and decrypting information on removable media such that users authorized to access and use the data do not have direct access to the encryption and decryption keys.

According to one embodiment of the present invention, a method for encrypting and storing data on a removable medium includes: obtaining a medium key uniquely associated with the removable medium; encrypting the data using the medium key to generate encrypted data; and writing the encrypted data onto the removable medium.

When the removable medium is uninitialized, the obtaining the medium key associated with the removable medium may include: generating a medium identifier associated with the removable medium; initializing the removable medium by writing the medium identifier onto the removable medium; generating the medium key; and storing the medium key.

The storing the medium key may include: associating the medium key with the medium identifier; and storing the medium key with the associated medium identifier in a central database.

The storing the medium key may include: encrypting the medium key using a public key associated with a destination encrypting input/output system to generate an encrypted medium key; and writing the encrypted medium key onto the removable medium.

When the removable medium is previously initialized, the obtaining the medium key associated with the removable medium may include: reading a medium identifier from the removable medium; and querying a central database using the medium identifier to retrieve the medium key associated with the removable medium.

When the removable medium is previously initialized, the obtaining the medium key associated with the removable medium may include decrypting an encrypted medium key using a private key of a destination encrypting input/output system, the encrypted medium key being stored on the removable medium.

According to another embodiment of the present invention, a method of reading encrypted data from a removable medium includes: obtaining a medium key associated with the removable medium; and decrypting the encrypted data using the medium key.

The obtaining the medium key associated with the removable medium may include: reading a medium identifier from the removable medium; and querying a central database using the medium identifier to retrieve the medium key associated with the removable medium.

The obtaining the medium key associated with the removable medium may include decrypting an encrypted medium key using a private key of a destination encrypting input/output system, the encrypted medium key being stored on the removable medium.

According to still another embodiment of the present invention, a system for encrypting and storing data on a removable medium includes a first encrypting input/output system (EIOS) configured to: obtain a medium key associated with the removable medium; encrypt the data using the medium key to generate encrypted data; and write the encrypted data onto the removable medium.

The first EIOS may be further configured to obtain the medium key associated with the removable medium by: generating a medium identifier associated with the removable medium; initializing the removable medium by writing the medium identifier onto the removable medium; generating the medium key; and storing the medium key, when the removable medium is uninitialized.

The system may further include a central database connected to the first EIOS over a network, wherein the storing the medium key comprises transmitting the medium key with the medium identifier over the network to be stored in the central database.

The system may further include a second encrypting input/output system (EIOS), wherein the storing the medium key may include: encrypting the medium key using a public key associated with the second EIOS to generate an encrypted medium key; and writing the encrypted medium key onto the removable medium.

The system may further include a central database connected to the first EIOS over a network, wherein the first EIOS may be further configured to obtain the medium key associated with the removable medium by: reading a medium identifier from the removable medium; and querying the central database using the medium identifier to retrieve the medium key associated with the removable medium, when the removable medium is previously initialized.

The first EIOS may be further configured to obtain the medium key associated with the removable medium by:

decrypting an encrypted medium key using a private key of the first EIOS to obtain the medium key, the encrypted medium key being stored on the removable medium.

According to another embodiment of the present invention, a system for decrypting encrypted data stored a removable medium includes a first encrypting input/output system (EIOS) configured to: obtain a medium key associated with the removable medium; and decrypt the data using the medium key to generate encrypted data.

The first EIOS may be further configured to obtain the medium key associated with the removable medium by: reading a medium identifier from the removable medium; and querying a central database using the medium identifier to retrieve the medium key associated with the removable medium.

The first EIOS may be further configured to obtain the medium key associated with the removable medium by: decrypting an encrypted medium key using a private key of the first EIOS to obtain the medium key, the encrypted medium key being stored on the removable medium.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to systems and methods for managing the encryption and decryption of sensitive data stored on removable media by controlling access to encryption and decryption keys such that users of the sensitive data do not have direct access to the encryption and decryption keys.

According to one embodiment of the present invention, encryption and decryption keys are stored at a central key authority. For the sake of convenience, the term "encryption key" will be used herein to refer to an encryption key and/or a decryption key and may refer to a symmetric key or an asymmetric key pair (e.g., a public/private key pair).

This invention can add significant new capabilities to existing government and corporate security systems. The technology, when incorporated into these infrastructures, provides an additional level of protection against insiders with access rights to sensitive data who may attempt to pull that sensitive data out of the enterprise without authorization. For example, aspects of embodiments of the present invention can be integrated with Raytheon's® SureView™ program, which is currently being used by the Defense Information Systems Agency (DISA) of the United States Department of Defense to provide security for warfighters' computers in the field. Such an addition may have blocked or impeded the methods used in leaking of classified data that was published by WikiLeaks in 2010. In addition, embodiments of the present invention may also be used by large corporations that need to control proprietary or sensitive financial information, law enforcement and other investigative organizations attempting to keep developing cases private, and medical institutions who have to comply with Health Insurance Portability and Accountability (HIPAA) privacy regulations.

Aspects of embodiments of the present invention are directed to preventing or impeding the unauthorized dissemination of sensitive information out of an enterprise by way of removable media, while still providing the advantages of using removable media to the enterprise in question. Aspects of embodiments of the present invention use cryptography to prevent anyone without access to the encryption key from being able to read data on the media, such that the removable media would be useless if inserted into a machine without access to the appropriate encryption key. According to embodiments of the present invention, the encryption key is not made available to the user and the user does not have access to the encryption key. Instead, the encryption key is created, stored and used by the systems (e.g., computing systems) of the enterprise and is not designed to leave the enterprise boundary and is generally available to systems within the enterprise. This means that the medium can be easily used on any computing device within the enterprise that has easy access to the key, but is unreadable on a computing device outside of the enterprise.

As such, embodiments of the present invention allows authorized users to access data and copy it to removable media and allows that media to be used elsewhere in the enterprise, but prevents that media from becoming a conduit for the unauthorized release of sensitive information because the media is unreadable outside of the enterprise. This can occur with very little impact on processing or I/O speeds and with little or no knowledge or interaction from the user (e.g., the encryption process is substantially transparent to the user).

Figure 1:
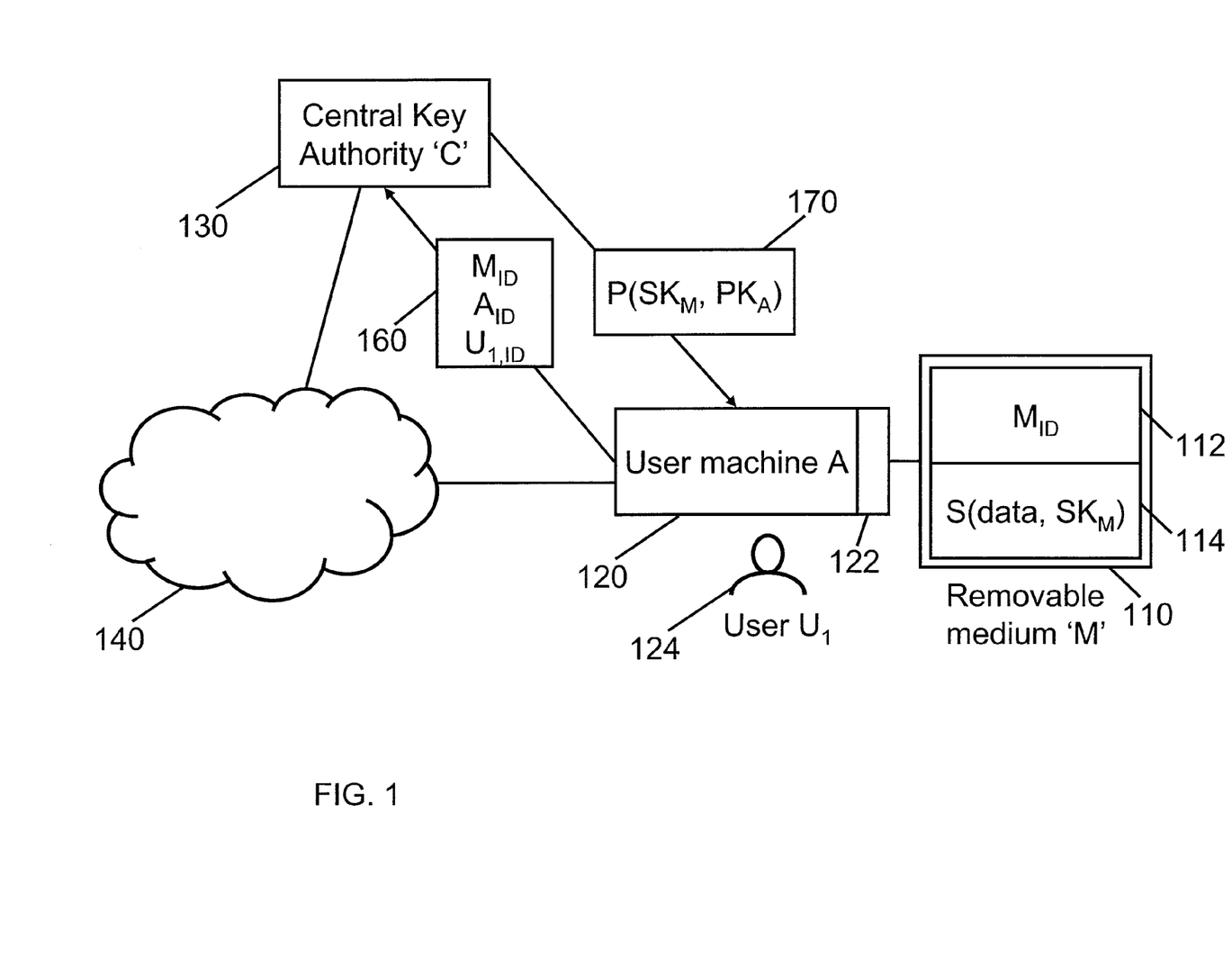
FIG. 1 is a block diagram illustrating a system for encrypting removable media according to one embodiment of the present invention.

FIG. 1 is a block diagram illustrating a system for encrypting removable media according to one embodiment of the present invention. The system for encrypting removable media 110 includes a networked user machine 120 (or "user machine A" in FIG. 1) into which the medium will be inserted, a network-accessible key authority 130 (which may also be referred to as a key management system, a central key store, or a Central Authority 'C' in FIG. 1) which is accessible to the user machine 120 over a TCP/IP or other data network 140. The user machine A 120 may be standard desktop or laptop computers running operating systems such as Microsoft® Windows®, Mac OS X®, or Linux. The user machines may also be other types of devices such as tablet computers, smartphones, personal digital assistants, or other computing devices.

According to one embodiment, the networked user machine 120 (user machine A) includes a built-in interface layer 122 designed to deal with the encrypted media. This interface layer may be referred to as an Encrypting Input/Output System (EIOS) 122, which may be implemented as specialized device drivers, an operating system 'shim', or specialized hardware. Specialized hardware would generally provide higher security, while specialized device drivers would be far lower cost, and a shim would lie somewhere between the other two. However, embodiments of the present invention implemented as hardware, software, an operating system shim, or equivalents or combinations thereof may operate in substantially the same manner and perform substantially the same functions. As used herein, the term "built-in" refers to hardware, software, and combinations thereof that are integrated components of a computer system and are not accessible to a user in the normal course of use. A component being "built-in" does not preclude the component from being later added to or removed from a computer system (e.g., an expansion card, dynamic memory, an application specific integrated circuit, etc. that is screwed, clipped, or soldered onto a motherboard of a computer system and which may be unscrewed, unclipped, or desoldered from the motherboard) by a technician when servicing the computer system or when components are replaced.

The EIOS 122 protects a medium encryption key (referred to as "$SK_M$" in the FIGS. 1 and 2) from access by the user 124 or other parts of the operating system running on user machine 120, provides an addressable identity with a public/private key pair (referred to as "$PK_A$" in FIGS. 1 and 2), and prevents access to the medium except through a particular encryption/decryption channel. All I/O to removable media on user machine A 120 passes through the EIOS 122 (which may have multiple instantiations for different media types such as CDs, USB drives, etc.), so the user will be unable to read from or write to removable media (e.g., CDs, DVDs, and USB flash memory and hard drives) except through the encrypting protection system including the EIOS 122. Enforcement of this restriction can be done by policy, OS protections, or hardware protections as appropriate for the enterprise in question.

In some embodiments of the present invention, when the EIOS 122 detects unencrypted data on inserted removable media, the EIOS 122 may pass the unencrypted data through to the rest of the user machine 120 in order to provide additional flexibility (e.g., so that the user machine 120 can, play unencrypted audio CDs unencrypted DVD movies, or read data from sources outside the enterprise). In other embodiments of the present invention, the EIOS 122 may disallow all input and output to unencrypted media in order to improve security (e.g., to protect against the introduction of a virus or other malware via a removable medium that was not initialized within the enterprise).

In some embodiments of the present invention, unencrypted data read from unencrypted removable media is segregated from and handled differently from data transferred from encrypted media. For example, data on an unencrypted medium (e.g., a flash drive or a CD) could be transferred to a fixed drive (e.g., a hard disk drive) of a user machine and stored either in encrypted or unencrypted form. The data read from the unencrypted medium could then later be transferred to another, unencrypted removable medium in unencrypted form.

Furthermore, in some embodiments, an EIOS 122 may be configured to write data originating from an encrypted source onto an unencrypted medium in unencrypted form if the data was explicitly flagged as being "approved" for writing to unencrypted media. For example, an approving authority may cryptographically sign the data to explicitly approve it for writing to unencrypted media in unencrypted form. The EIOS 122 can then verify the signature before writing the unencrypted data in unencrypted form.

The user machine A 120 shown in FIG. 1 is within the enterprise's data realm. The edge of this realm includes user machines 120 that have appropriate built-in EIOS hardware/software 122, that have been authorized to use those capabilities to utilize removable media 110, and that have identities (e.g., $A_{ID}$ as shown in FIG. 1) and public keys (e.g., $PK_A$) known to the enterprise infrastructure (notably the central key authority C 130). User machine A 120 in FIG. 1 is an example of these boundary user machines at the edge of the realm.

In some embodiments of the present invention, the network-accessible key authority C is a cloud-based key management system in which the keys are stored in a centralized system or a distributed key management system in which the keys are stored in a number of different computers connected to one another over a network. In another embodiment, if none of the machines in the enterprise are connected to the network, then all of the medium keys may be stored on the medium, as encrypted with the public key of the receiving computer. Generally, a key management system according to embodiments of the present invention meets the following characteristics: 1) it can securely store keys; 2) it can encrypt keys that are sent to a particular EIOS so that only that EIOS can decrypt them; 3) it can provide proof of authenticity for the keys so that the EIOS knows they came from the trusted source; 4) it can decrypt new media keys sent to it by an EIOS and can verify that the key was generated by a trusted EIOS; and 5) it can look up the correct key for a given medium identifier as presented by an EIOS. The network-accessible key authority securely stores medium encryption keys on a safe storage device (e.g., one that is encrypted or otherwise physically protected) and retrieves the medium encryption keys based on a given medium identifier. The network-accessible key authority also encrypts keys so that only designated recipients (e.g., particular enterprise user machines 120 with EIOS hardware/software 122) can decode the keys (e.g., using public key cryptography or shared secrets), and may also cryptographically sign the encrypted keys so that the recipient EIOS system 122 can verify the source of the keys.

Figure 2:
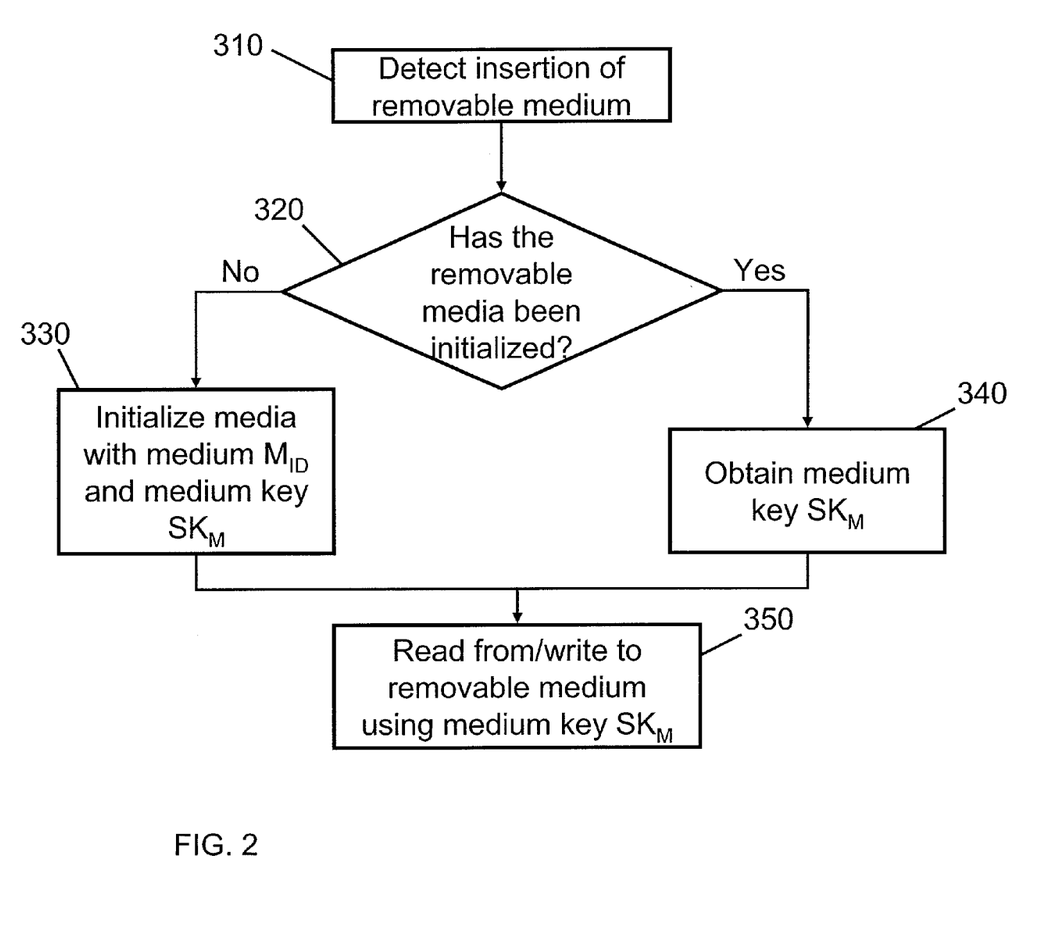
FIG. 2 is a flowchart illustrating a method of using a removable medium with an encrypting input/output system (EIOS) according to one embodiment of the present invention.

FIG. 2 is a flowchart illustrating a method of using a removable medium with an EIOS according to one embodiment of the present invention. Referring to FIG. 1, when the user first inserts a removable medium 110 (e.g., a hard drive, a USB drive, a CD, a DVD, etc.) into a user machine 120 having an EIOS 122, the BIOS 122 detects 310 whether the removable medium 110 has been initialized for use with the system by detecting whether a system area 122 including a medium identifier $M_{ID}$ is present 320. If the system area is not present, the EIOS will initialize 330 the removable medium 110 by requesting or generating a medium identifier $M_{ID}$ and a medium key $SK_M$ and writing the medium identifier $M_{ID}$ to the removable medium.

The medium identifier $M_{ID}$ and medium key $SK_M$ are substantially unique to the particular removable medium 110 (e.g., every CD, DVD, and USB drive used in the system may be provided with a unique medium identifier $M_{ID}$ and a unique cryptographic key $SK_M$) and they can be obtained by generating them locally (e.g., by the EIOS 122 or by the user machine 120) or by having them generated remotely (e.g., by the central key authority C 130). The medium identifier $M_{ID}$ can be made deterministically unique using any of a number of algorithms, such as concatenating an organization ID, a device ID, and a unique sequence number.

Figure 3A:
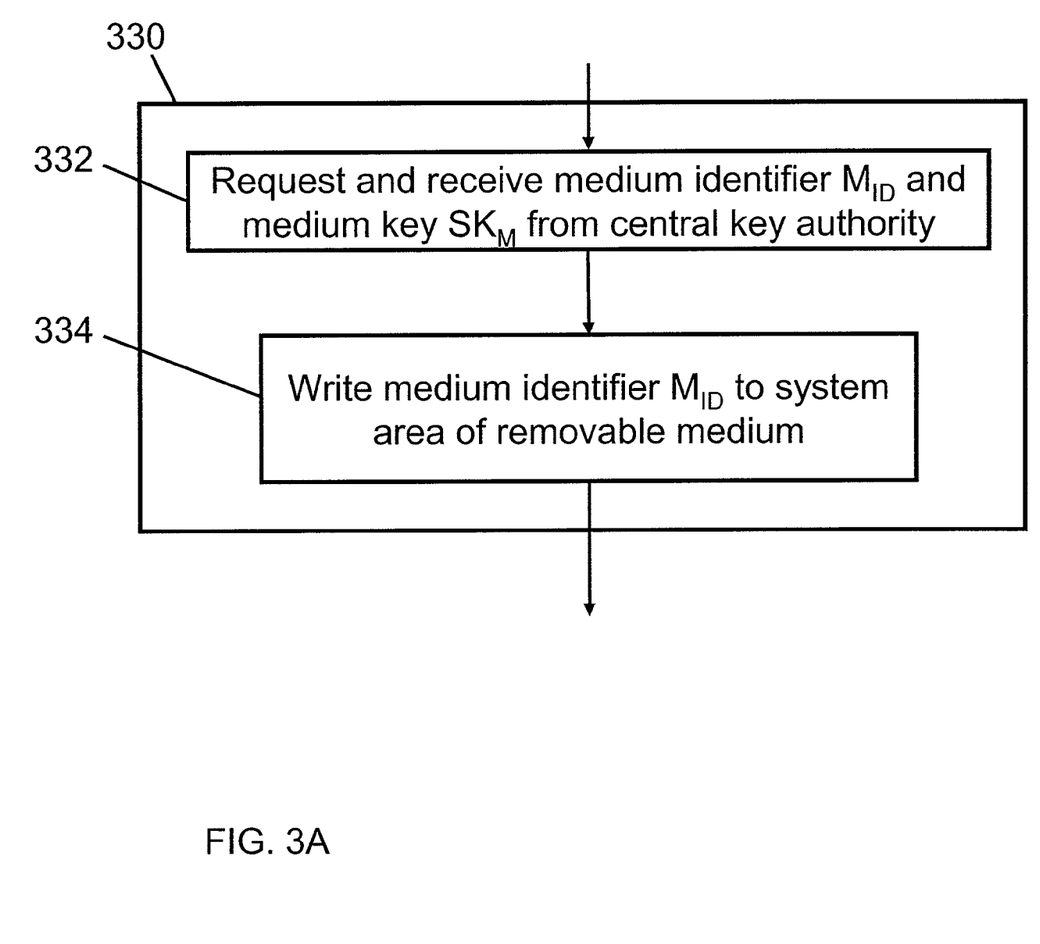
FIG. 3A is a flowchart illustrating a method of initializing a removable medium for use with an EIOS according to one embodiment of the present invention.
Figure 3B:
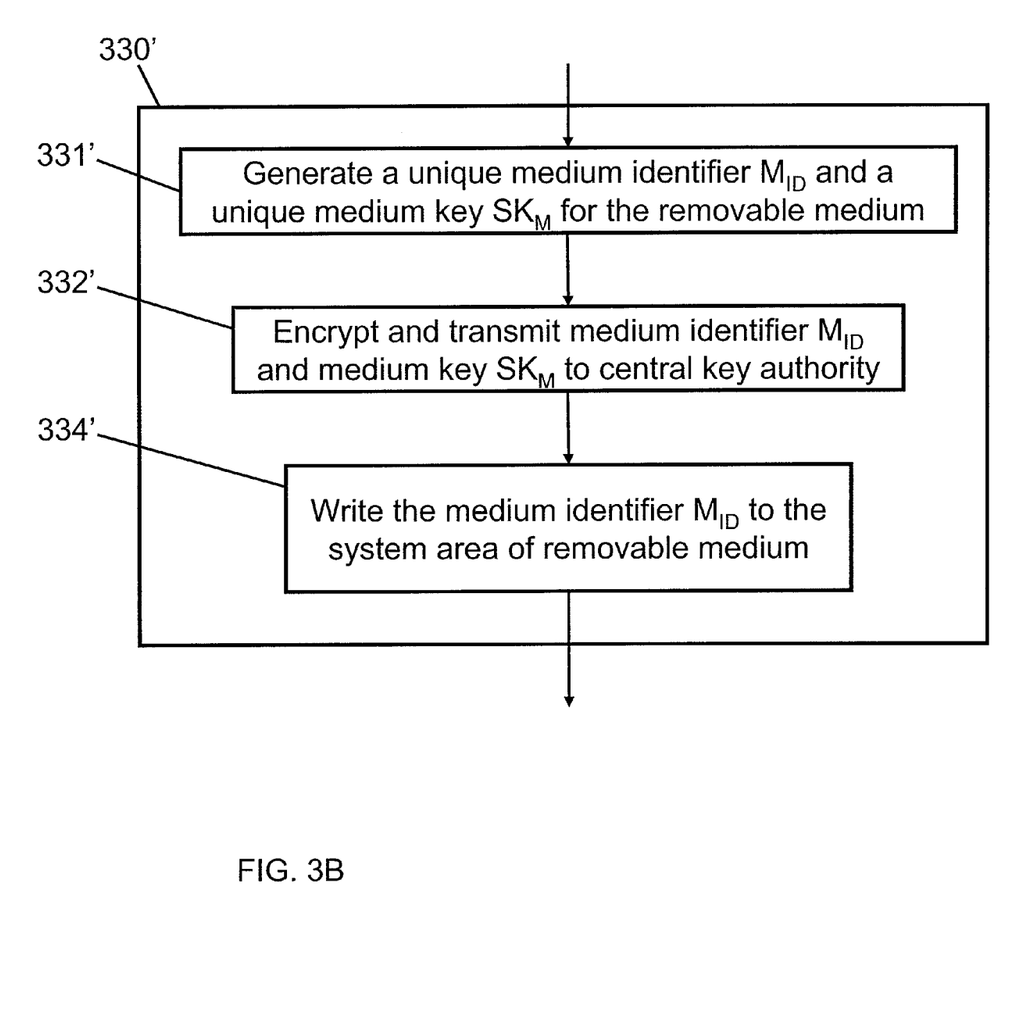
FIG. 3B is a flowchart illustrating a method of initializing a removable medium for use with an EIOS according to another embodiment of the present invention.

If the medium identifier $M_{ID}$ and the medium key $SK_M$ are generated by the central key authority C 130, then both are stored in the central key authority C 130 and encrypted and transmitted to the user machine A 120 over the network. As such, referring to FIG. 3A, a user machine 120 would initialize 330 a removable medium 110 by requesting and receiving 332 the medium identifier $M_{ID}$ and medium key $SK_M$ from the central key authority and then writing the medium identifier $M_{ID}$ to the system area 112 of the removable medium 110. Referring to FIG. 3B, if the medium identifier $M_{ID}$ and medium key $SK_M$ are locally generated 331' (e.g., at the user machine 120 and/or by the EIOS 122), the medium identifier $M_{ID}$ and medium key $SK_M$ are encrypted and sent 332' to the central key authority C to be stored for future use and the medium identifier $M_{ID}$ is written 334' to the system area 112 of the removable medium 110.

According to one embodiment, during the initialization process, the EIOS 122 writes a special record containing the medium identifier $M_{ID}$ (but not the medium key $SK_M$) in a system area 112 of the removable medium 120 (e.g., in the initial block of the medium, as shown in FIGS. 1 and 2). The EIOS 122 is then ready to handle reads or writes to the medium, encrypting or decrypting the data using the medium key $SK_M$ which is temporarily stored in the built-in memory of the EIOS 122 (the EIOS 122 being built-in to the user machine 120) while the removable medium 110 is being used. All access to the removable medium 110 passes through the encrypting/decrypting channel of the EIOS 122, therefore ensuring that all data written to the removable medium 110 is encrypted. Once the removable medium 110 is removed from the user machine A 120, the medium key $SK_M$ can be discarded from the EIOS 122 because a copy of the medium key $SK_M$ is stored at the central key authority C 130.

When the removable medium 110 is inserted into a user machine A 120 of the enterprise after initialization, the EIOS on that user machine detects 310 (see FIG. 2) the insertion of the removable medium 110, reads the system area 112, and finds the medium identifier $M_{ID}$ to identify that the removable medium has been initialized 340. The user machine used to read the removable medium 110 may the same user machine that was used to initialize the removable medium 110 (e.g., user machine A 120) or may be a different user machine (e.g., user machine B 150, see FIG. 5). Detecting the medium ID $M_{ID}$ in the system area 112 identifies the removable medium 110 as being encrypted and the medium ID $M_{ID}$ is used to obtain the appropriate medium key $SK_M$ associated with the medium identifier $M_{ID}$.

As such, embodiments of the present invention allow encrypted data be written to and read from removable media without intervention from the user, thereby allowing the enterprise to retain full control of the encryption keys (e.g., the medium keys) used to encrypt the data. In systems according to embodiments of the present invention, the user does not need and does not have access to the encryption keys, thereby reducing the risk of the leakage of sensitive data.

Figure 4:
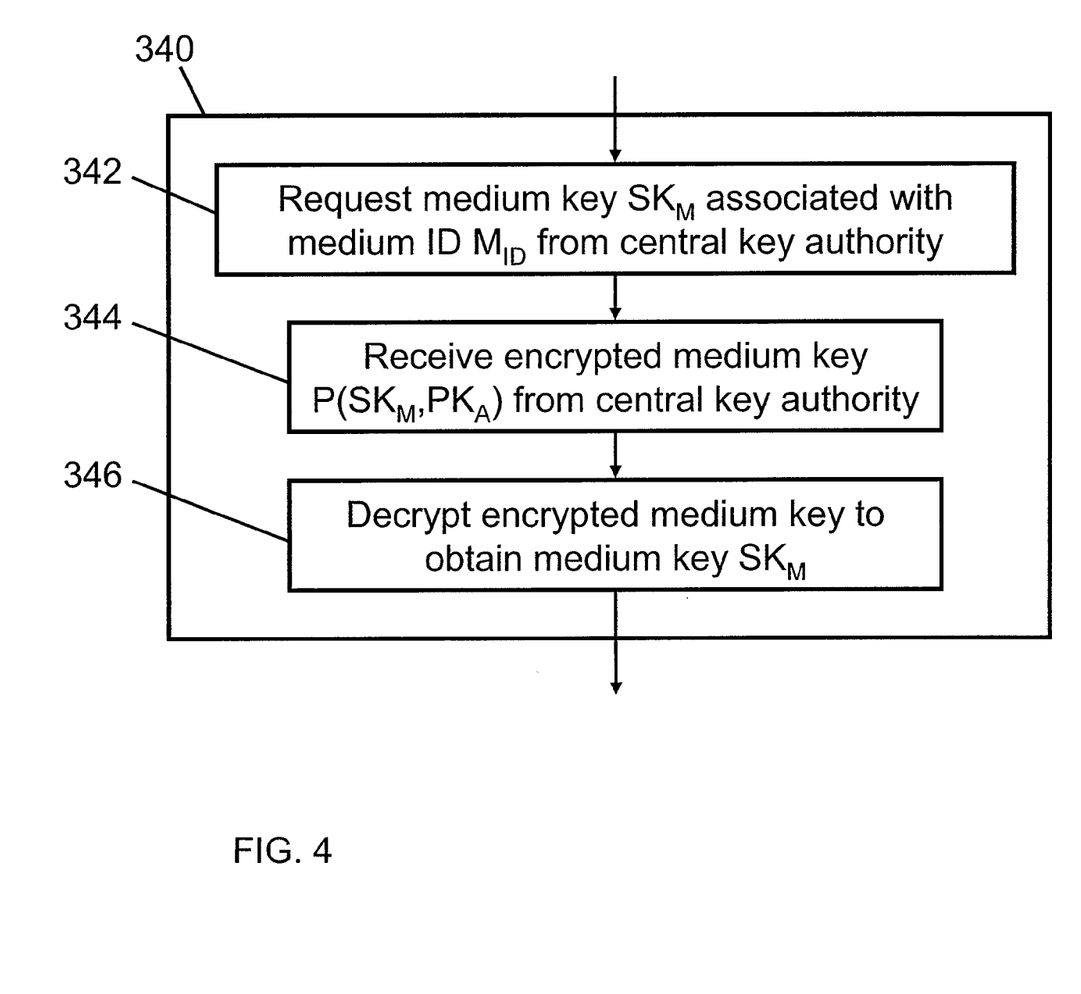
FIG. 4 is a flowchart illustrating a method of obtaining a medium key according to one embodiment of the present invention.

FIG. 4 is a flowchart illustrating a method of obtaining a medium key $SK_M$ from a central key authority 130 according to one embodiment of the present invention. Referring to FIGS. 1 and 4, according to one embodiment, to obtain 340 the appropriate medium key $SK_M$ (or decryption key), the user machine A 120 requests 342 the medium key $SK_M$ from the central key authority C 130 by sending a query 160 with the medium identifier $M_{ID}$, a user machine ID (e.g., $A_{ID}$ for user machine A 120), and optionally a cryptographic nonce for replay protection and/or a user ID $U_{1,ID}$ for the user $U_1$ 124. The user machine ID $A_{ID}$ and the user ID $U_{1,ID}$ may be authenticated using techniques that are well known in the art (e.g., digital signatures using public-key cryptography).

After authenticating the user machine A (using the user machine ID $A_{ID}$) and/or the user (using the user ID $U_{1,ID}$) attempting to access the removable medium 110, a response 170 with the medium key $SK_M$ and the nonce will be encrypted so that only the requesting EIOS 122 can decrypt it. For example, the medium key $SK_M$ may be encrypted using the public key $PK_A$ of the requesting user machine A, which is denoted in FIG. 1 as $P(SK_M, PK_A)$. The EIOS 122 of the user machine A can then receive 344 and decrypt 346 the medium key $PK_A$ using its private key. The decrypted medium key $SK_M$ can then be used to read from and write to the removable medium 110 using the same encryption key and as the first time the removable medium was inserted into an enterprise machine.

According to one embodiment of the present invention, the central key repository also tracks the usage of removable media 110 as they move around the enterprise by logging when and which user machines 120 or 150 request the medium key $SK_M$.

Figure 5:
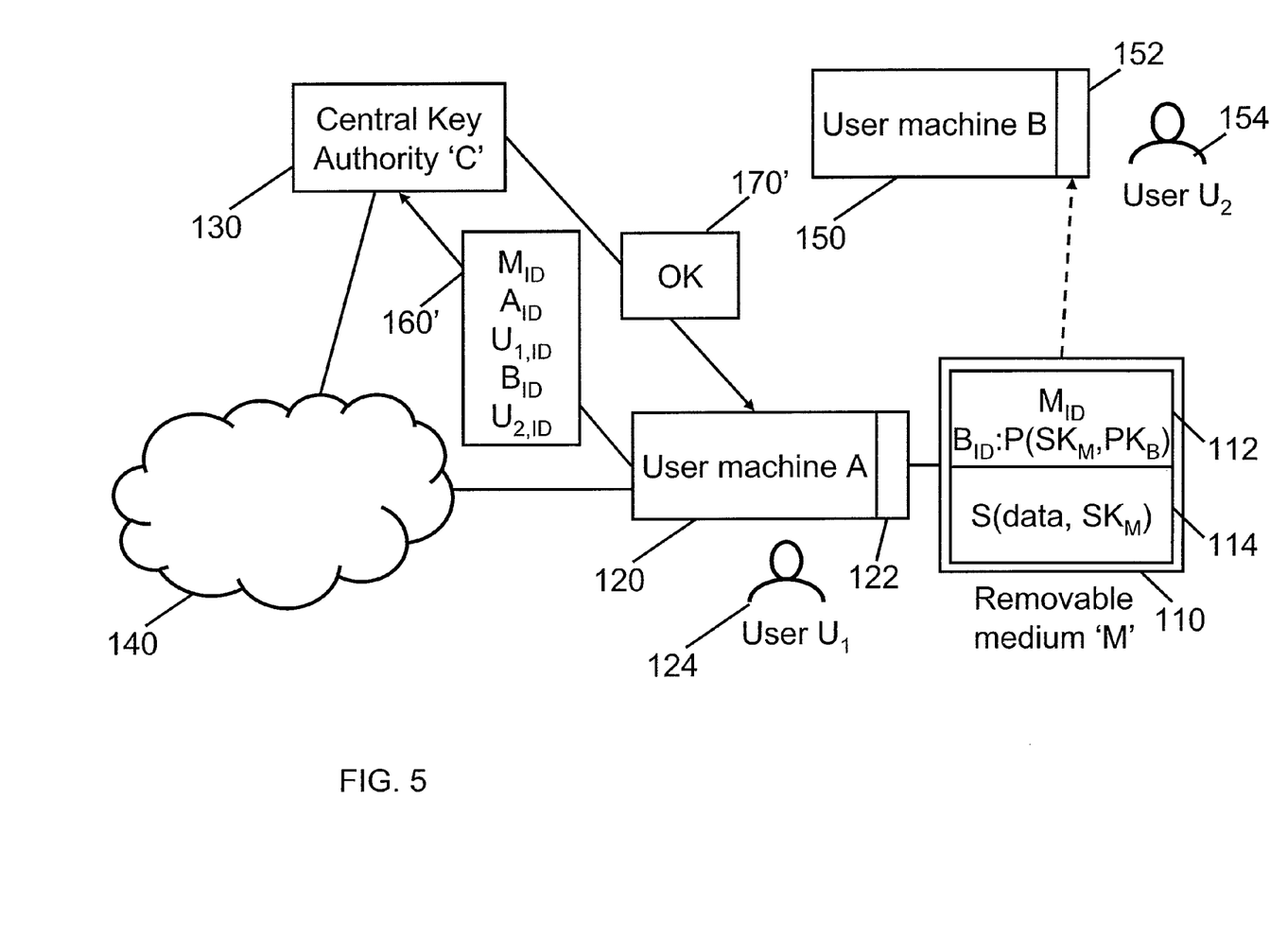
FIG. 5 is a block diagram illustrating a system for encrypting removable media for transfer to destination user machines not having a network connection according to one embodiment of the present invention.

FIG. 5 is a block diagram illustrating a system for encrypting removable media according to another embodiment of the present invention, in which the system includes a user machine 150 (e.g., computer B in FIG. 2) that is not connected to the central store over a data network. Referring to FIG. 5, the medium key $SK_M$ may be transferred to user machines A 120 and B 150 that are within the enterprise, but may not be network connected to the central key authority C 130.

Figure 6:
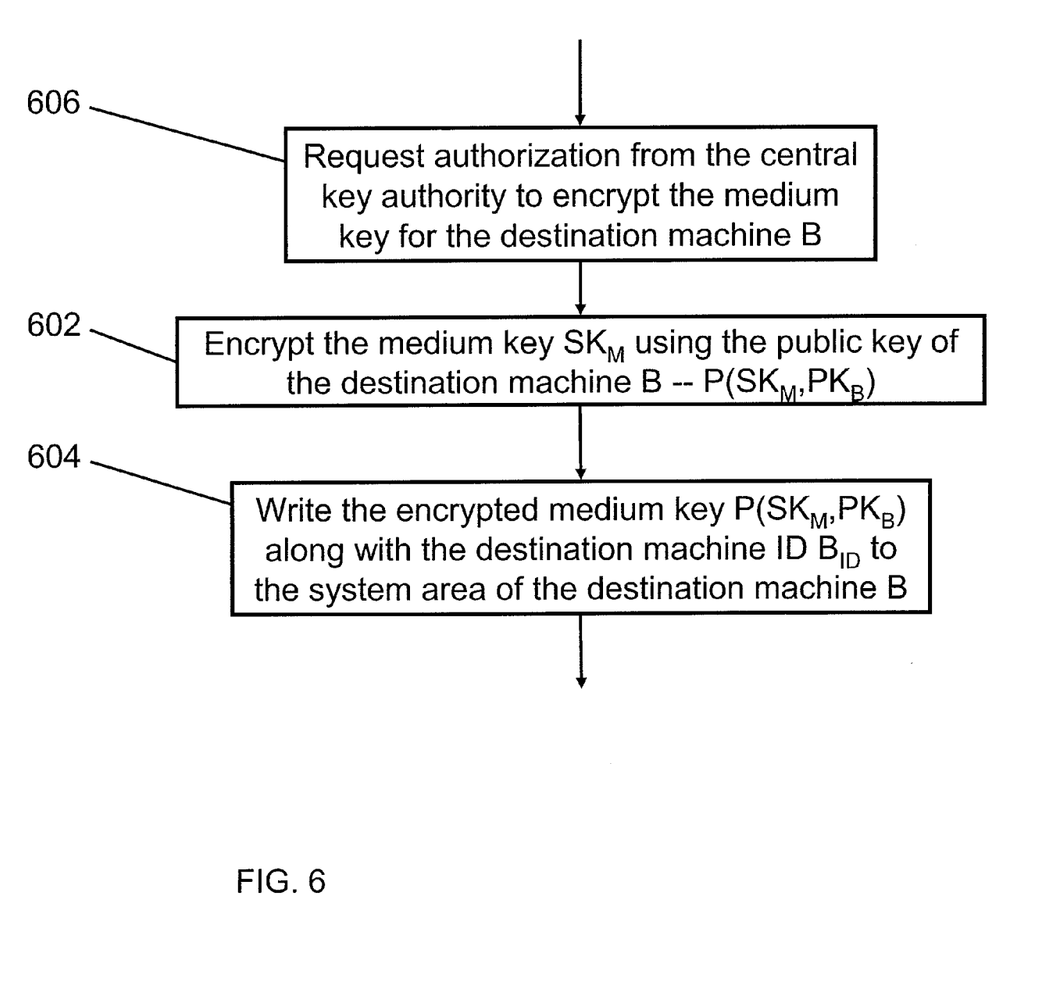
FIG. 6 is a flowchart illustrating a method of encrypting a medium key $SK_M$ for access by a destination user machine not having a network connection according to one embodiment of the present invention.

FIG. 6 is a flowchart illustrating a method of encrypting a medium key $SK_M$ for access by a destination user machine not having network access according to one embodiment of the present invention. In this case, the source user machine A 120 (on the network) encrypts 602 the medium key $SK_M$ using the public key $PK_B$ of the EIOS 152 in the destination user machine B 150. This encrypted medium key $P(SK_M, PK_B)$, along with a machine ID $B_{ID}$ associated with the destination user machine B 150 $B_{ID}$, is then written to the removable medium 110 in the same block as the medium ID $M_{ID}$ or in the system area 112. The sending user machine A 120 may also optionally send 606 a request 160' to the central key authority C 130 including the medium ID $M_{ID}$, the sending user machine ID $A_{ID}$, the sending user ID $U_{1,ID}$, the destination user machine ID $B_{ID}$, and the destination user ID $U_{2,ID}$ in to receive approval 170' to send the data to the destination machine.

In another embodiment of the present invention, the medium key $SK_M$ is encrypted using the public key $PK_B$ of the destination user machine B and stored on a different removable medium. For example, a set of one or more encrypted CDs may be mass duplicated and the copies of the set of CDs may be sent to multiple recipient destination user machines 120. Each recipient destination user machine 120 would also be sent another removable medium containing a set of medium keys $SK_M$ for decrypting the set of CDs, those medium keys $SK_M$ being encrypted with the public key of the particular recipient destination user machine (e.g., encrypted medium keys $P(SK_M, PK_B)$. As such, identical copies of the same encrypted media may be sent to multiple recipients for use with particular destination user machines 120, each recipient receiving a different removable medium containing the decryption keys $SK_M$ encrypted for use only by the corresponding destination recipient user machine 120. This arrangement improves convenience by allowing the same set of media (or copies of the same media) to be used with multiple destination user machines and may also improve security by sending the encrypted media and the encryption keys along different paths.

When the removable medium 110 is inserted in the unconnected destination user machine B 150, the EIOS 152 of the destination user machine B 150 can find the encrypted key $P(SK_M, PK_B)$ by looking for its machine ID $B_{ID}$ in the system area 112 of the removable medium 110, then decrypt the medium key $SK_M$ using the private key paired with its public key $PK_B$. The decrypted medium key $SK_M$ can then be used to read from and write to the removable medium 110 in a manner substantially the same as described above.

Figure 7:
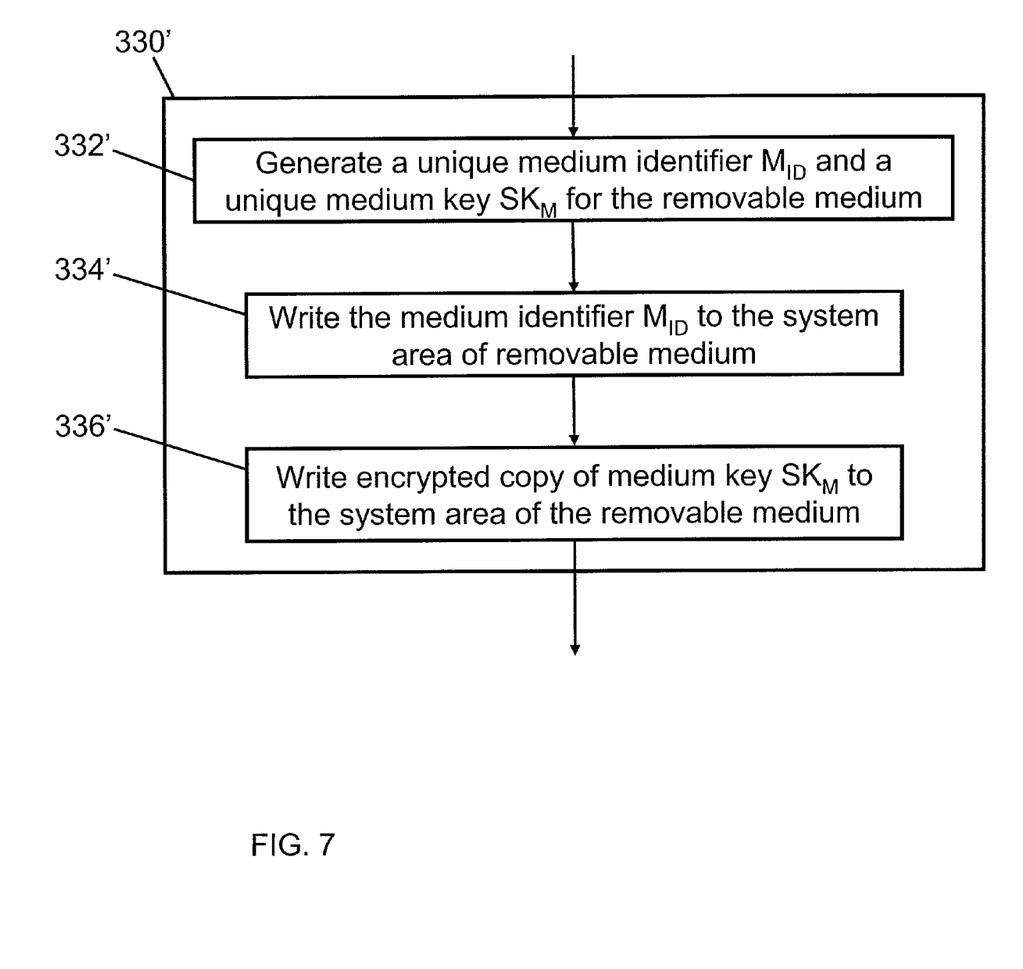
FIG. 7 is a flowchart illustrating a method of initializing a removable medium for use with an EIOS according to one embodiment of the present invention.

FIG. 7 is a flowchart illustrating a method of initializing a removable medium for use with an EIOS according to one embodiment of the present invention. Referring to FIG. 7, if the unconnected machine B 150 is the source of the removable medium 110 (i.e., the removable medium 110 is to be initialized by the unconnected machine B 150), the unconnected machine's EIOS 152 would locally generate 332' a medium ID $M_{ID}$ and a medium key $SK_M$ (see, e.g., FIG. 5) and write 334' the medium ID $M_{ID}$ to the system area 112 of the removable medium 110. In addition, in order to be able to recover the medium key $SK_M$ if the removable medium 110 was ever reinserted into the unconnected machine B 150, and the EIOS 152 would write the machine ID $B_{ID}$ in association with the medium key $SK_M$ encrypted by the unconnected machine's public key (i.e., $P(SK_M, PK_B)$) to the first block or system area 112 of the removable medium. To allow the medium to be used on other machines (network connected or not), the EIOS 152 would use the same approach described above, in which a destination machine ID (e.g., $A_{ID}$) and the medium key $SK_M$ encrypted with the destination machine's public key (i.e. $P(SK_M, PK_A)$) were written to the initial block or system area 112 of the removable medium 110. According to one embodiment of the present invention, the first time the removable medium 110 is inserted into a network connected machine, the medium ID $M_{ID}$ and the medium key $SK_M$ are sent to the central key authority C 130 for future tracking and use of the removable medium 110.

If the removable medium 110 is inserted into a machine outside of (or external to) the enterprise, it will be unreadable even if that machine included EIOS software or hardware. This is because the external machine would not have an identity and public key known to the central key authority C of the enterprise and as such it would not be able to retrieve a valid machine key from the central key authority C or be able to decrypt any of the encrypted keys stored in the system area 112 of the removable medium 110. Therefore, without being able to obtain the medium key $SK_M$ for the removable medium 110, the EIOS of the external machine would not be able to decrypt information on the removable medium.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, while the embodiments described above focus on removable media, a similar approach could be used to encrypt hard drives or other non-removable media types. This would provide protection for user machines that were stolen or captured. Without the key being available from the central key store C, the contents of the hard drive or other non-removable media would be inaccessible and the user of the stolen or captured machine could not be forced into revealing the medium key because he or she would not have direct access to the medium key.

In addition, the central key store, while being conceptually expressed as a single central service, could easily be distributed throughout the enterprise's network for redundancy.

Furthermore, in some embodiments of the present invention, the encrypted medium keys are signed by the party encrypting the key, thereby reducing the risk that an adversary could create a disk that would appear legitimate (and hence could have sensitive data written to it by a user machine within the enterprise) but that would have a key that would be known by the adversary (thereby making it readable by the adversary). As such, a user machine could use the signature associated with the encrypted key to verify that the encrypted medium was initialized by a trusted party and not by an adversary.

What is claimed is:

1. A method for encrypting and storing data on a removable medium when coupled to a computer, the method comprising:

storing a medium key uniquely associated with the removable medium in a memory remote from the computer and accessible by the computer via a network, wherein the memory is accessible only by computers in a particular enterprise;

providing an encrypting input/output system (EIOS) executing on the computer to obtain the medium key associated with the removable medium, wherein all the data input/output to/from the removable medium, when coupled to the computer, passes through the EIOS;

when the removable medium is coupled to the computer, detecting by the EIOS whether the data on the removable medium is encrypted;

when the data on the removable medium is unencrypted allowing access to the unencrypted data;

when the data on the removable medium is encrypted, authenticating the computer for access to the memory remote from the computer by determining that the computer is in the particular enterprise;

obtaining, by the computer, the medium key uniquely associated with the removable medium, when the computer is authenticated;

decrypting, by the computer, the encrypted data on the removable medium, using the medium key to generate decrypted data;

encrypting, by the computer, data to be written to the removable medium, using the medium key to generate encrypted data; and writing, by the computer, the encrypted data onto the removable medium, wherein the medium key is not stored in the removable medium, wherein, when the removable medium is previously initialized, the obtaining the medium key associated with the removable medium comprises:

reading a medium identifier from the removable medium; and querying memory remote from the computer using the medium identifier to authenticate the computer and retrieve the medium key associated with the removable medium, and wherein, when the removable medium is previously initialized, the obtaining the medium key associated with the removable medium comprises:

using an encryption key associated with a destination encrypting input/output system to decrypt an encrypted medium key, the encrypted medium key being stored on the memory remote from the computer.

2. The method of claim 1, wherein, when the removable medium is being initialized, the obtaining the medium key associated with the removable medium comprises:
generating a medium identifier associated with the removable medium;
initializing the removable medium by writing the medium identifier onto the removable medium; and
generating the medium key.

3. The method of claim 2, wherein the storing the medium key comprises:
associating the medium key with the medium identifier; and
storing the medium key with the associated medium identifier in memory remote from the computer.

4. The method of claim 2, wherein the storing the medium key comprises:
encrypting the medium key to generate an encrypted medium key, the medium key being encrypted with an encryption key associated with a destination encrypting input/output system; and
writing the encrypted medium key onto the memory remote from the computer.

5. The method of claim 1, further comprising separating unencrypted data read from the removable medium from encrypted data read from the removable medium.

6. A system for encrypting and storing data on a removable medium when coupled to a computer, the system comprising:
a hardware memory remote from the computer and accessible by the computer via a network for storing a medium key uniquely associated with the removable medium in, wherein the memory is accessible only by computers in a particular enterprise;
an encrypting input/output system (EIOS) executing on the computer to obtain the medium key associated with the removable medium, wherein all the data input/output to/from the removable medium, when coupled to the computer, passes through the EIOS, wherein the EIOS:
detects whether the data on the removable medium is encrypted, when the removable medium is coupled to the computer,
allows access to the unencrypted data, when the data on the removable medium is unencrypted, and
authenticate the computer for access to the memory remote by determining that the computer is in the particular enterprise, when the data on the removable medium is encrypted,
wherein the computer:
obtains the medium key associated with the removable medium, when the computer is authenticated;
decrypts the encrypted data on the removable medium, using the medium key to generate decrypted data;
encrypts the data to be written to the removable medium, using the medium key to generate encrypted data, and writes the encrypted data onto the removable medium; and
a central database stored in the memory remote from the computer, wherein the EIOS obtains the medium key associated with the removable medium by:
reading a medium identifier from the removable medium, and querying the central database using the medium identifier to retrieve the medium key associated with the removable medium, when the removable medium is previously initialized, wherein the EIOS obtains the medium key associated with the removable medium by:
decrypting an encrypted medium key using an encryption key of the EIOS to obtain the medium key, the encrypted medium key being stored on the memory remote from the computer.

7. The system of claim 6, wherein the EIOS obtains the medium key associated with the removable medium by:
generating a medium identifier associated with the removable medium;
initializing the removable medium by writing the medium identifier onto the memory remote from the computer; and
generating the medium key.

8. The system of claim 7, further comprising a central database stored in the memory remote from the computer, wherein the storing the medium key comprises transmitting the medium key with the medium identifier over the network to be stored in the central database.

9. The system of claim 6, wherein the EIOS obtains the medium key associated with the removable medium by:
receiving an encrypted medium key associated with the removable medium, the encrypted medium key being encrypted with an encryption key uniquely associated with the EIOS; and
decrypting the encrypted medium key using the encryption key uniquely associated with the EIOS.

10. The system of claim 9, wherein the encryption key uniquely associated with the EIOS is a public/private key pair,
wherein the encrypted medium key is encrypted with the public key uniquely associated with the EIOS, and
wherein the EIOS is configured to decrypt the encrypted medium key using the private key uniquely associated with the EIOS.

11. The system of claim 6, wherein the EIOS separates unencrypted data read from the removable medium from encrypted data read from the removable medium.

* * * * *